(12) United States Patent
Kwon

(10) Patent No.: US 9,676,327 B2
(45) Date of Patent: Jun. 13, 2017

(54) REAR SIDE OBSTACLE DISPLAY METHOD AND APPARATUS OF VEHICLE

(71) Applicant: Hyundai Mobis Co., Ltd., Seoul (KR)

(72) Inventor: Yang Woo Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 154 days.

(21) Appl. No.: 14/701,759

(22) Filed: May 1, 2015

(65) Prior Publication Data
US 2016/0144784 A1 May 26, 2016

(30) Foreign Application Priority Data

Nov. 25, 2014 (KR) ........................ 10-2014-0165544

(51) Int. Cl.
| | |
|---|---|
| *B60Q 1/00* | (2006.01) |
| *B60Q 9/00* | (2006.01) |
| *G01S 15/08* | (2006.01) |
| *G01S 15/93* | (2006.01) |
| *G01S 13/93* | (2006.01) |

(52) U.S. Cl.
CPC .............. *B60Q 9/006* (2013.01); *G01S 15/08* (2013.01); *G01S 15/931* (2013.01); *G01S 2013/9353* (2013.01)

(58) Field of Classification Search
CPC .... B60Q 9/006; B60Q 9/004; G62D 15/0285; G62D 15/028; G08G 1/166
USPC ..... 340/435, 932.2, 936, 436; 180/204, 169; 701/301, 70, 41; 348/148, 118
See application file for complete search history.

(56) References Cited

U.S. PATENT DOCUMENTS

| | | | | |
|---|---|---|---|---|
| 6,170,591 | B1 * | 1/2001 | Sakai ................. | B62D 15/0285 180/204 |
| 6,186,259 | B1 * | 2/2001 | Shimizu ............. | B62D 15/0285 180/204 |
| 7,924,171 | B2 * | 4/2011 | Kawabata ........... | B62D 15/027 340/435 |
| 2008/0079607 | A1 * | 4/2008 | Uemura ............... | B62D 15/028 340/932.2 |
| 2010/0283632 | A1 * | 11/2010 | Kawabata ............. | G08G 1/166 340/932.2 |
| 2010/0283634 | A1 * | 11/2010 | Krautter ................ | B60Q 9/004 340/932.2 |
| 2013/0057690 | A1 * | 3/2013 | Mitsugi ................. | G08G 1/166 348/148 |
| 2013/0325313 | A1 * | 12/2013 | Kim .................... | B60R 21/0134 701/301 |
| 2015/0098622 | A1 * | 4/2015 | Ryu .......................... | B60R 1/00 382/104 |
| 2015/0151750 | A1 * | 6/2015 | Tsuchiya ............... | B60W 30/09 701/41 |

(Continued)

*Primary Examiner* — Hoi Lau
(74) *Attorney, Agent, or Firm* — H.C. Park & Associates, PLC

(57) ABSTRACT

Disclosed is a method of displaying a rear side obstacle of a vehicle, including: a first measuring step of measuring a first distance between a vehicle and an obstacle using a first sensor; a determining step of determining a position of the obstacle using the first distance, a moving distance of the vehicle, and a steering angle of the vehicle related with the moving distance; and a displaying step of displaying the position of the obstacle. Therefore, the position of the obstacle at the rear side of the vehicle is precisely predicted so that a driver may be notified in advance that the vehicle may hit the obstacle.

18 Claims, 3 Drawing Sheets

(56) References Cited

U.S. PATENT DOCUMENTS

| | | | |
|---|---|---|---|
| 2015/0274158 A1* | 10/2015 | Fujita | B60W 30/00 |
| | | | 701/23 |
| 2016/0003943 A1* | 1/2016 | Nakano | G08G 1/166 |
| | | | 701/301 |
| 2016/0144784 A1* | 5/2016 | Kwon | B60Q 9/006 |
| | | | 340/435 |

* cited by examiner

REAR SIDE OBSTACLE DISPLAY METHOD AND APPARATUS OF VEHICLE

CROSS-REFERENCE TO RELATED APPLICATIONS

This application claims priority from and the benefit of Korean Patent Application No. 10-2014-0165544, filed on Nov. 25, 2014, which is hereby incorporated by reference for all purposes as if fully set forth herein.

BACKGROUND

Field

Exemplary embodiments relate to a method and an apparatus of displaying a rear side obstacle of a vehicle, and in particular, to a method and an apparatus of displaying a rear side obstacle of a vehicle using at least one ultrasonic sensor.

Discussion of the Background

When a driver parks or backs a car, a parking assistance system of the related art notifies an interval between the car and an obstacle to the driver through a display device, a sound signal or an optical signal.

The parking assistance system displays a region of a distance between the car and the obstacle using a plurality of ultrasonic sensors and cameras so as to be seen by the driver.

Here, the ultrasonic sensor only measures a distance between the car and the obstacle using a time when a signal is reflected to return from the obstacle and thus according to the parking assistance system, it is difficult to check where the obstacle is located among a front side, a left side, and a right side with respect to the ultrasonic sensor.

When a plurality of ultrasonic sensors is used in the parking assistance system, a sensing region may be subdivided to more precisely determine a position of the obstacle. However, in this case, when the number of sensors is increased, cost may also be increased.

As such, when four or more ultrasonic sensors are used in the parking assistance system, the sensing region is subdivided to determine a position of the obstacle, but when two or less ultrasonic sensors are used, the sensing region is broadly divided into two regions and the position of the obstacles is approximately determined in accordance with a characteristic of a radiation angle.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method and an apparatus of displaying a rear side obstacle of a vehicle which precisely determine and display a position of a rear side obstacle of a vehicle using at least one ultrasonic sensor.

Additional aspects will be set forth in the detailed description which follows, and, in part, will be apparent from the disclosure, or may be learned by practice of the inventive concept.

According to exemplary embodiments, a method of displaying a rear side obstacle of a vehicle includes: a first measuring step of measuring a first distance between a vehicle and an obstacle using a first sensor; a determining step of determining a position of the obstacle using the first distance, a moving distance of the vehicle, and a steering angle of the vehicle related with the moving distance; and a displaying step of displaying a position of the obstacle.

The determining step may include a calculating step of calculating the moving distance using a speed of the vehicle when the vehicle moves after measuring the first distance; a predicting step of predicting a second distance between the vehicle and the obstacle using the moving distance and the first distance; and a second measuring step of measuring a third distance between the vehicle and the obstacle when the obstacle is detected by the first sensor after the vehicle moves the moving distance.

In the determining step, when a driving direction of the vehicle in accordance with the steering angle is the left with respect to a backing state, the position of the obstacle may be determined by comparing the second distance and the third distance.

In the determining step, when the second distance and the third distance are equal to each other, the front of the first sensor may be determined as the position of the obstacle.

In the determining step, when the second distance is longer than the third distance, the left side of the first sensor may be determined as the position of the obstacle.

In the determining step, when the second distance is shorter than the third distance, the right side of the first sensor may be determined as the position of the obstacle.

In the determining step, when a driving direction of the vehicle in accordance with the steering angle the right with respect to a backing state, the position of the obstacle may be determined by comparing the second distance and the third distance.

In the determining step, when the second distance and the third distance are equal to each other, the front of the first sensor may be determined as the position of the obstacle.

In the determining step, when the second distance is longer than the third distance, the right side of the first sensor may be determined as the position of the obstacle.

In the determining step, when the second distance is shorter than the third distance, the left side of the first sensor may be determined as the position of the obstacle.

In the determining step, when a driving direction of the vehicle in accordance with the steering angle is straight with respect to a backing state, the position of the obstacle may be determined by comparing the second distance and the third distance.

In the determining step, when the second distance and the third distance are equal to each other, the front of the first sensor may be determined as the position of the obstacle.

In the determining step, when the second distance and the third distance are not equal to each other and a second sensor which is spaced apart from the first sensor by a predetermined distance detects the obstacle, a position between the first sensor and the second sensor may be determined as the position of the obstacle.

In the determining step, when the second sensor does not detect the obstacle, one side of the first sensor which is not adjacent to the second sensor may be determined as the position of the obstacle.

According to exemplary embodiments, an apparatus of displaying a rear side obstacle of a vehicle includes: a sensor unit which measures a first distance between a vehicle and an obstacle; a control unit which determines a position of the obstacle using the first distance, a moving distance of the vehicle, and a steering angle of the vehicle related with the moving distance; and a display unit which displays the position of the obstacle determined by the control unit.

The control unit may include a calculating unit which calculates the moving distance using a speed of the vehicle and a steering angle of the vehicle when the vehicle moves after measuring the first distance, the calculating unit may calculate a second distance between the vehicle and the obstacle using the moving distance and the first distance, the sensor unit may measure a third distance between the vehicle and the obstacle when the obstacle is detected by the first sensor after the vehicle moves the moving distance, and the control unit may compare the moving distance and the third distance to determine the position of the obstacle.

According to exemplary embodiments of the method and apparatus of displaying a rear side obstacle of a vehicle, it is possible to precisely determine where an obstacle at a rear side of a vehicle is located among a left side, a right side, and a front side with respect to a first sensor using a second distance and a steering angle of the vehicle in accordance with prediction.

A position of an obstacle at the rear side of the vehicle is precisely predicted, so that it may be notified to a driver in advance that the vehicle may hit an obstacle and the driver may be assisted to easily park the vehicle without hitting the obstacle.

Only one or two ultrasonic sensors are needed to obtain the same performance as four ultrasonic sensors and thus the cost may be saved due to the reduced number of sensors.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

Figure 1:
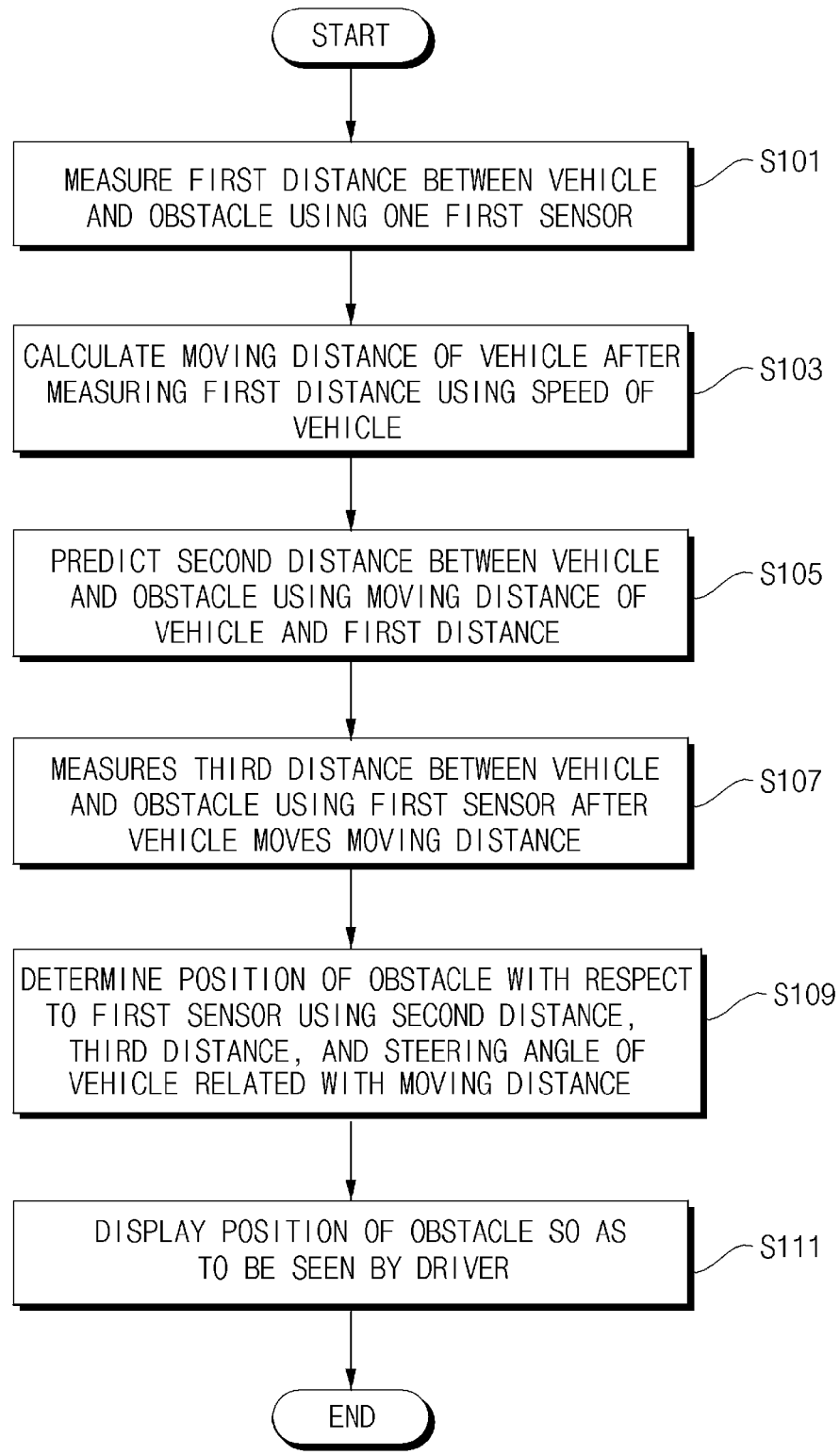
FIG. 1 is a flow chart briefly illustrating a method of displaying a rear side obstacle of a vehicle according to an exemplary embodiment.

It should be understood that the appended drawings are not necessarily to scale, presenting a somewhat simplified representation of various features illustrative of the basic principles of the invention. The specific design features of the present inventive concept as disclosed herein, including, for example, specific dimensions, orientations, locations, and shapes will be determined in part by the particular intended application and use environment.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element is referred to as being "on," "connected to," or "coupled to" another element or layer, it may be directly on, connected to, or coupled to the other element or intervening elements or layers may be present. When, however, an element is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Referring to FIGS. 1 to 5, a method of displaying a rear side obstacle of a vehicle according to an exemplary embodiment may include a first obtaining step S101, a calculating step S103, a predicting step S105, a second obtaining step S107, a determining step S109, and a displaying step S111.

In the first obtaining step S101, a sensor unit 100 detects an obstacle which is adjacent to a vehicle using a first sensor to obtain a first distance between the vehicle and the obstacle. Here, the first distance may indicate a distance between a vehicle and an obstacle at a time when the obstacle is initially detected. The first sensor may be an ultrasonic sensor, but is not limited thereto.

In the calculating step S103, when the vehicle moves after obtaining the first distance, a control unit 200 calculates a distance the vehicle has moved from the time when the first distance is obtained using vehicle speed information. Here, the distance the vehicle has moved, or "moving distance," may be calculated by a time when the vehicle moves and then stops from the time when the first distance is obtained and a vehicle speed.

In the predicting step S105, the control unit 200 predicts a second distance between the vehicle and the obstacle using the calculated moving distance and the first distance obtained by the sensor unit 100. Here, the second distance may refer to a predicted remaining distance between the vehicle and the obstacle and may be predicted by subtracting the moving distance from the first distance.

In the second obtaining step S107, the sensor unit 100 detects the obstacle again by the first sensor after the vehicle moves the moving distance to obtain a third distance between the vehicle and the obstacle.

In the determining step S109, the control unit 200 determines a position of the obstacle with respect to the first sensor using the second distance, the third distance, and a steering angle of the vehicle which is related with the moving distance. Here, the determining method will be described in detail with reference to FIGS. 2 to 4.

In the displaying step S111, the display unit 300 displays the position of the obstacle determined in the determining step S109 through one of various possible display devices so as to be seen by the driver.

Accordingly, a position of an obstacle at the rear side of the vehicle is precisely predicted, so that the driver may be notified in advance that the vehicle may hit an obstacle. Based on the notification, the driver may be assisted in determining the obstacle position so as to easily park the vehicle without hitting the obstacle.

Figure 2:
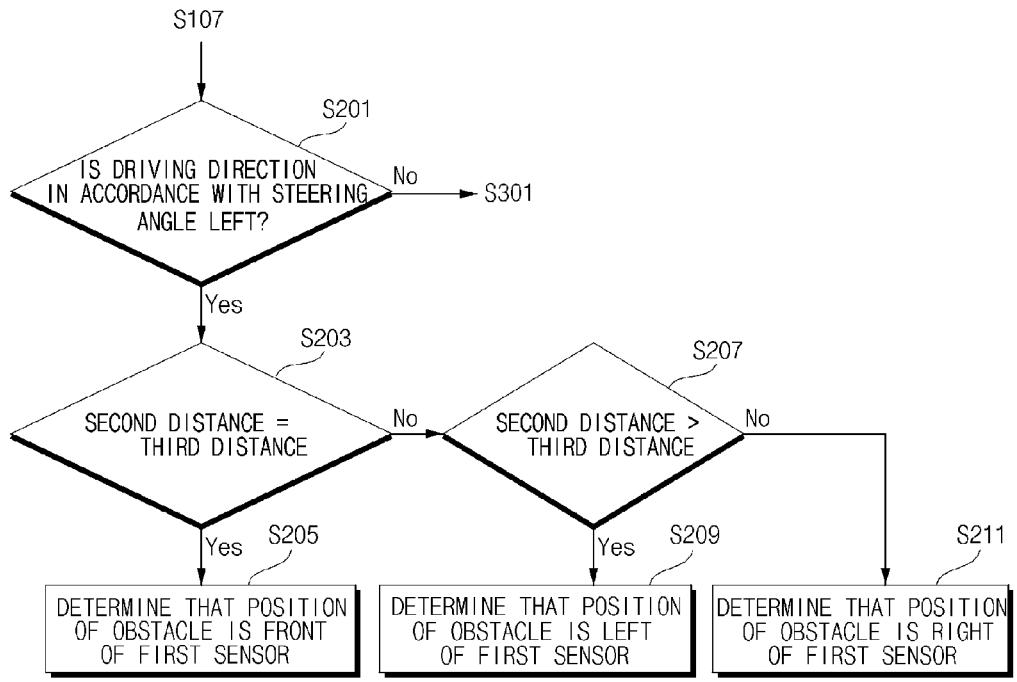
FIGS. 2, 3, and 4 are flow charts explaining a method of determining a position of an obstacle in the method of displaying a rear side obstacle of a vehicle according to an exemplary embodiment.

The determining step S109 of the method of displaying a rear side obstacle of a vehicle according to an exemplary embodiment will be described with reference to FIG. 2. First, the control unit 200 determines whether a driving direction of the vehicle in accordance with a steering angle of the vehicle is toward the left in step S201. Here, a left turn refers to a driving direction when the driver backs the vehicle and whether the driver turns left refers to whether the vehicle is turned left while the vehicle moves the moving distance.

When the driving direction of the vehicle in accordance with the steering angle of the vehicle is toward the left, the control unit 200 determines whether the second distance and the third distance are equal to each other by comparing the second distance and the third distance in step S203. Further, when the driving direction of the vehicle is not left, the sequence goes to step S301 which will be described with reference to FIG. 3.

When the second distance and the third distance are equal to each other, the control unit 200 determines that the obstacle is located in the front with respect to the first sensor in step S205. In step S203, when the second distance is not equal to the third distance, the control unit 200 determines whether the second distance is longer than the third distance in step S207.

When the second distance is longer than the third distance, the control unit 200 determines that the obstacle is located at the left with respect to the first sensor in step S209.

In step S207, when the second distance is shorter than the third distance, the control unit 200 determines that the obstacle is located at the right with respect to the first sensor in step S211.

The determined position of the obstacle is displayed through one of various display devices so as to be seen by the driver in step S111.

Accordingly, a position of an obstacle at the rear side of the vehicle is precisely predicted, so that the driver may be notified in advance that the vehicle may hit an obstacle. Based on the notification, the driver may be assisted in determining the obstacle position so as to easily park the vehicle without hitting the obstacle Referring to FIG. 3, a determining method when the driving direction of the vehicle is not toward the left in step S201 of FIG. 2 will be described.

After step S201, when the driving direction of the vehicle is not toward the left, the control unit 200 determines whether the driving direction of the vehicle in accordance with the steering angle of the vehicle is toward the right in step S301. Here, a right turn refers to a driving direction when the driver backs the vehicle and whether the driver turns right refers to whether the vehicle is turned right while the vehicle moves the moving distance.

When the driving direction of the vehicle in accordance with the steering angle of the vehicle is the right, the control unit 200 determines whether the second distance and the third distance are equal to each other in step S303. Further, when the vehicle is not backed right, the sequence goes to step S401 which will be described with reference to FIG. 4.

When the second distance and the third distance are equal to each other, the control unit 200 determines that the obstacle is located in the front with respect to the first sensor in step S305.

When the second distance is not equal to the third distance, the control unit 200 determines whether the second distance is longer than the third distance in step S307.

When the second distance is longer than the third distance, the control unit 200 determines that the obstacle is located at the left with respect to the first sensor in step S309.

In step S307, when the second distance is shorter than the third distance, the control unit 200 determines that the obstacle is located at the right with respect to the first sensor in step S311.

The display unit 300 displays the determined position of the obstacle through various display devices so as to be seen by the driver in step S111.

Figure 3:
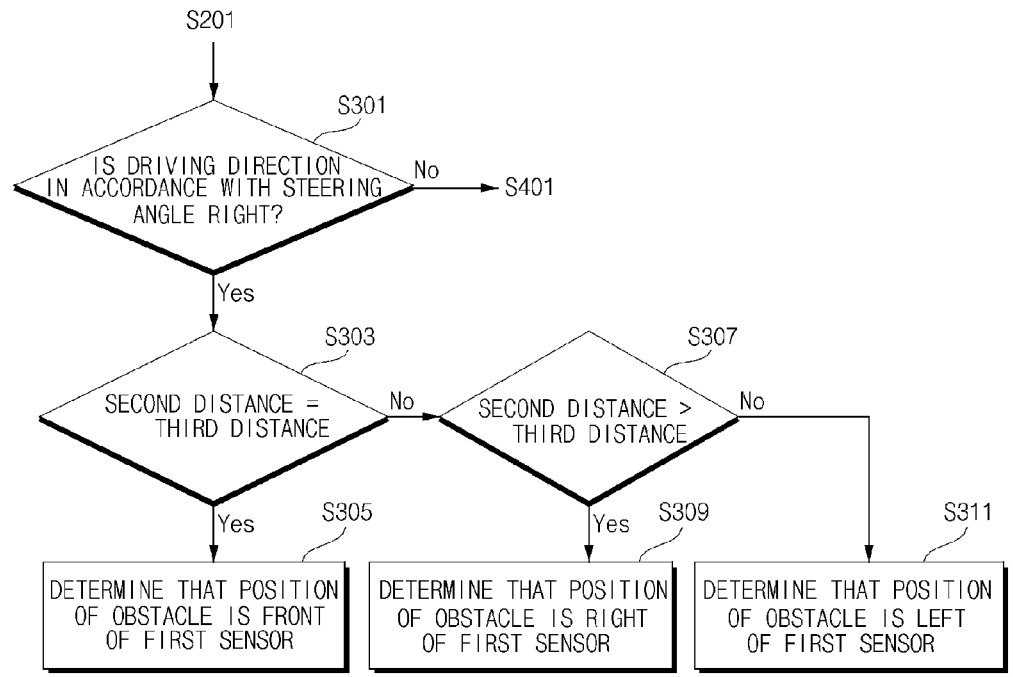
Figure 4:
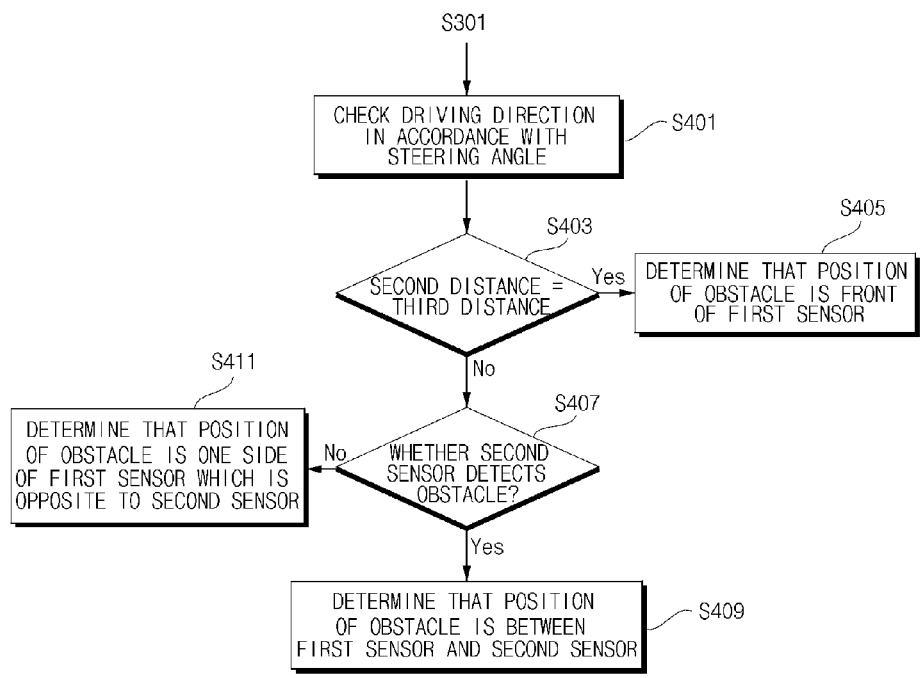

Referring to FIG. 4, a determining method when the driving direction of the vehicle is not toward the left or the right in step S201 of FIG. 2 and in step S301 of FIG. 3 will be described.

The control unit 200 checks whether the driving direction of the vehicle is straight with respect to a backing state by the vehicle steering angle in step S401.

The control unit 200 determines whether the second distance and the third distance are equal to each other in step S403.

When the second distance and the third distance are not equal to each other, the control unit 200 determines that the obstacle is located in the front with respect to the first sensor in step S405. In contrast, when the second distance and the third distance are equal to each other after step S403, the control unit 200 checks whether a second sensor which is spaced apart from the first sensor by a predetermined distance detects an obstacle in step S407.

When the second sensor detects an obstacle, the control unit 200 determines that the obstacle is located between the first sensor and the second sensor in step S409. In contrast, when the second sensor does not detect the obstacle in step S407, the control unit 200 determines that the obstacle is located at one side of the first sensor which is not adjacent to the second sensor in step S411.

The display unit 300 displays the determined position of the obstacle through one of various possible display devices so as to be seen by the driver in step S111.

Even though it is described that according to the method of displaying a rear side obstacle of a vehicle, the first sensor initially detects an obstacle, the position of the obstacle may be determined in accordance with the above-described method after the second sensor initially detects the obstacle.

Figure 5:
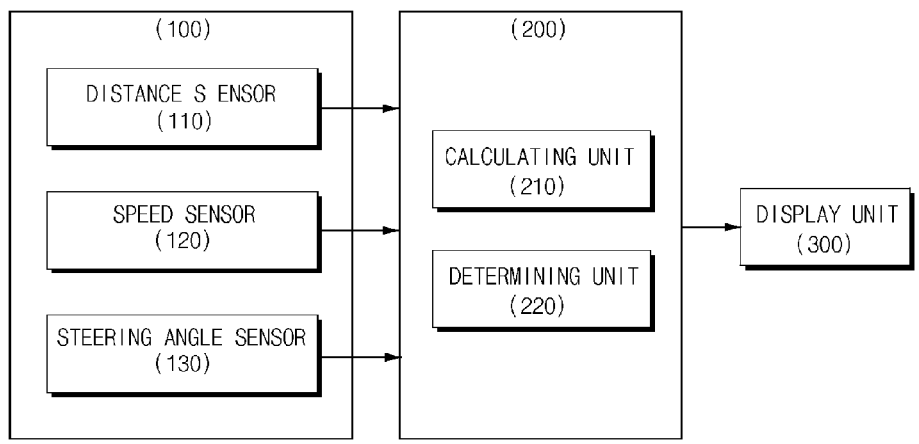
FIG. 5 is a block diagram briefly illustrating an apparatus of displaying a rear side obstacle of a vehicle according to an exemplary embodiment.

Referring to FIG. 5, an apparatus of displaying a rear side obstacle of a vehicle according to an exemplary embodiment may include a sensor unit 100, a control unit 200, and a display unit 300.

The sensor unit 100 is a device which obtains various information of a vehicle and includes a distance sensor 110, a speed sensor 120, and a steering angle sensor 130.

The distance sensor 110 is a sensor which measures a distance between a vehicle and another object (obstacle) which is adjacent to the vehicle and for example, may be an ultrasonic sensor. The distance sensor 110 may be configured to use two sensors, such as a first sensor and a second sensor which may be mounted at left and right sides of a rear bumper of a vehicle.

The distance sensor 110 may measure a distance between the vehicle and the obstacle by an ultrasonic signal which hits and returns from the obstacle after being radiated, although other types of distance sensors are also usable. When the distance sensor 110 detects the obstacle, the distance sensor 110 measures a distance (a first distance and a third distance) between the vehicle and the obstacle to transmit the distance to the control unit 200.

The speed sensor 120 is a sensor which measures a speed of the vehicle and transmits the measured speed of the vehicle to the control unit 200. Specifically, the speed sensor 120 may transmit the speed of the vehicle while the vehicle moves the moving distance from a time when obtaining the first distance to the control unit 200.

The steering angle sensor 130 is a sensor which measures a steering angle of the vehicle and transmits the measured steering angle of the vehicle to the control unit 200. Specifically, the speed sensor 120 may transmit the steering angle of the vehicle while the vehicle moves the moving distance from a time when obtaining the first distance to the control unit 200.

The control unit 200 receives information from the distance sensor 110, the speed sensor 120, and the steering angle sensor 130, and analyzes the information to determine the position of the obstacle. The control unit 200 includes a calculating unit 210 and a determining unit 220.

The calculating unit 210 calculates the moving distance of the vehicle using the first distance transmitted from the distance sensor 110 and the speed of the vehicle transmitted from the speed sensor 120. The calculating unit 210 predicts a second distance between the vehicle and the obstacle using the calculated moving distance and the first distance.

The determining unit 220 may determine where the obstacle is located with respect to the distance sensor 110 which detects the obstacle using the third distance transmitted from the distance sensor 110, the second distance calculated by the calculating unit 210, and the steering angle of the vehicle transmitted from the steering angle sensor 130.

The display unit 300 is a device which displays the position of the obstacle determined by the control unit 200 to be seen by the driver and displays the position of the obstacle through at least one of various known display devices.

In exemplary embodiments, an apparatus for displaying a rear side obstacle of a vehicle, and/or one or more components thereof, may be implemented via known sensors, displays, and one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, an apparatus for displaying a rear side obstacle of a vehicle, and/or one or more components thereof may include or otherwise be associated with one or more memories (not shown) including code (e.g., instructions) configured to cause the apparatus, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. For example, although disclosed for a reverse direction, the inventive concept may also be used in a forward direction. Accordingly, the inventive concept is not limited to such embodiments, but rather to the broader scope of the presented claims and various obvious modifications and equivalent arrangements.

What is claimed is:
1. A method for vehicle obstacle notification, comprising:
measuring a first distance between a vehicle and an obstacle using a first sensor;
determining a position of the obstacle using the first distance, a moving distance of the vehicle, and a steering angle of the vehicle associated with the moving distance; and
displaying the position of the obstacle,
wherein the determining comprises:

calculating the moving distance using a speed of the vehicle when the vehicle moves after measuring the first distance;

predicting a second distance between the vehicle and the obstacle using the moving distance and the first distance; and measuring a third distance between the vehicle and the obstacle when the obstacle is detected by the first sensor after the vehicle moves the moving distance.

2. The method of claim 1, wherein when a driving direction of the vehicle in accordance with the steering angle is left with respect to a moving state, the position of the obstacle is determined by comparing the second distance and the third distance.

3. The method of claim 2, wherein when the second distance and the third distance are equal to each other, a front of the first sensor is determined as the position of the obstacle.

4. The method of claim 2, wherein when the second distance is longer than the third distance, a left side of the first sensor is determined as the position of the obstacle.

5. The method of claim 2, wherein when the second distance is shorter than the third distance, a right side of the first sensor is determined as the position of the obstacle.

6. The method of claim 1, wherein when a driving direction of the vehicle in accordance with the steering angle is right with respect to a moving state, the position of the obstacle is determined by comparing the second distance and the third distance.

7. The method of claim 6, wherein when the second distance and the third distance are equal to each other, a front of the first sensor is determined as the position of the obstacle.

8. The method of claim 6, wherein when the second distance is longer than the third distance, a right side of the first sensor is determined as the position of the obstacle.

9. The method of claim 6, wherein when the second distance is shorter than the third distance, a left side of the first sensor is determined as the position of the obstacle.

10. The method of claim 1, wherein when a driving direction of the vehicle in accordance with the steering angle is straight with respect to a backing state, the position of the obstacle is determined by comparing the second distance and the third distance.

11. The method of claim 10, wherein when the second distance and the third distance are equal to each other, a front of the first sensor is determined as the position of the obstacle.

12. The method of claim 10, wherein when the second distance and the third distance are not equal to each other and a second sensor which is spaced apart from the first sensor by a predetermined distance detects the obstacle, a position between the first sensor and the second sensor is determined as the position of the obstacle.

13. The method of claim 12, wherein when the second sensor does not detect the obstacle, one side of the first sensor which is not adjacent to the second sensor is determined as the position of the obstacle.

14. The method of claim 1, wherein when the moving state is a backing state.

15. An apparatus for vehicle obstacle notification, comprising:

a sensor unit comprising a first sensor and configured to measure a first distance between a vehicle and an obstacle;

a control unit configured to determine a position of the obstacle using the first distance, a moving distance of the vehicle, and a steering angle of the vehicle related with the moving distance; and a display unit configured to display the position of the obstacle determined by the control unit, wherein:

the control unit comprises a calculating unit configured to calculate the moving distance using a speed of the vehicle and a steering angle of the vehicle when the vehicle moves after measuring the first distance, the calculating unit is configured to calculate a second distance between the vehicle and the obstacle using the moving distance and the first distance, the sensor unit is configured to measure a third distance between the vehicle and the obstacle when the obstacle is detected by the first sensor after the vehicle moves the moving distance, and the control unit is configured to compare the moving distance and the third distance to determine the position of the obstacle.

16. The apparatus of claim 15, wherein the sensor unit further comprises a second sensor spaced a predetermined distance from the first sensor.

17. The apparatus of claim 15, wherein the sensor unit consists essentially of the first sensor.

18. The apparatus of claim 16, wherein the sensor unit consists essentially of the first sensor and the second sensor.

* * * * *